US006253598B1

(12) United States Patent
Weldon et al.

(10) Patent No.: US 6,253,598 B1
(45) Date of Patent: Jul. 3, 2001

(54) METHOD AND SYSTEM FOR PREDICTING STABILIZED TIME DURATION OF VAPOR LEAK DETECTION PUMP STROKES

(75) Inventors: Craig Weldon; Gilles Delaire, both of Chatham (CA)

(73) Assignee: Siemens Automotive Inc., Chatham (CA)

( * ) Notice: Subject to any disclaimer, the term of this patent is extended or adjusted under 35 U.S.C. 154(b) by 0 days.

(21) Appl. No.: 09/464,581

(22) Filed: Dec. 16, 1999

(51) Int. Cl.[7] ..................................................... G01M 3/26

(52) U.S. Cl. ........................... 73/40; 73/40.5 R; 73/49.7; 123/198 D; 123/518

(58) Field of Search ............................. 73/40, 40.5, 42.7, 73/49.2, 118.1; 123/518, 519, 520; 701/31

(56) References Cited

U.S. PATENT DOCUMENTS 4,498,332 * 2/1985 Bruckhoff ................................ 73/40
5,383,437 * 1/1995 Cook et al. .......................... 123/520
5,474,050 12/1995 Cook et al. .......................... 123/520
5,499,614 * 3/1996 Busato et al. ........................ 123/520
5,668,328 * 9/1997 Steber et al. ....................... 73/862.23

* cited by examiner

*Primary Examiner*—Hezron Williams
*Assistant Examiner*—Charles D. Garber

(57) ABSTRACT

A system and method for indicating leakage from a contained volume for holding volatile liquid, such as from an evaporative emission space of an automotive vehicle fuel system. A reciprocating pump operates to build pressure in the space toward a nominal test pressure. As the pressure is building toward nominal test pressure, but before nominal test pressure is achieved, measurements of substantially the amount of time required for the pump to execute a defined downstroke are repeatedly taken. These measurements may be referred to as pulse durations, and they are processed by an algorithm to detect when the rate of change in pulse duration changes from positive to negative, thereby defining the inflection point of a logistic curve. Subsequent measurements are taken and processed to predict a value at which substantially the pulse duration will ultimately stabilize. The predicted value is processed to indicate any leakage.

16 Claims, 4 Drawing Sheets

X2, X3 - POINTS AFTER POINT OF INFLECTION

X2, X3 - POINTS AFTER POINT OF INFLECTION

METHOD AND SYSTEM FOR PREDICTING STABILIZED TIME DURATION OF VAPOR LEAK DETECTION PUMP STROKES

INCORPORATION BY REFERENCE

Commonly owned U.S. Pat. Nos. 5,383,437; 5,474,050; and 5,499,614 are expressly incorporated herein by reference.

FIELD OF THE INVENTION

This invention relates generally to the measurement of gas leakage from a contained volume, such as fuel vapor leakage from an evaporative emission space of an automotive vehicle fuel system. More particularly the invention relates to a new and unique system and method for predicting the time duration of the stroke of a reciprocating leak detection pump that would be expected to occur once pressure created by the pump in the contained volume for performance of a leak test has stabilized at a nominal test pressure, such time duration being indicative of effective leak size smaller than a gross leak.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake system of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake system through the canister purge valve. For example, fuel vapors may be purged to an intake manifold of an engine intake system by the opening of a CPS-type valve in response to a signal from the engine management computer, causing the valve to open in an amount that allows intake manifold vacuum to draw fuel vapors that are present in the tank headspace, and/or stored in the canister, for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure.

It is believed fair to say that from a historical viewpoint two basic types of vapor leak detection systems for determining integrity of an evaporative emission space have evolved: a positive pressure system that performs a test by positively pressurizing an evaporative emission space; and a negative pressure (i.e. vacuum) system that performs a test by negatively pressurizing (i.e. drawing vacuum in) an evaporative emission space. The former may utilize a pressurizing device, such as a pump, for pressurizing the evaporative emission space; the latter may utilize either a devoted device, such as a vacuum pump, or engine manifold vacuum created by running of the engine.

Commonly owned U.S. Patents and Patent Applications disclose various systems, devices, modules, and methods for performing evaporative emission leak detection tests by positive and negative pressurization of the evaporative emission space being tested. Commonly owned U.S. Pat. No. 5,383,437 discloses the use of a reciprocating pump that alternately executes a downstroke and an upstroke to create positive pressure in the evaporative emission space. Commonly owned U.S. Pat. No. 5,474,050 embodies advantages of the pump of U.S. Pat. No. 5,383,437 while providing certain improvements in the organization and arrangement of a reciprocating pump.

The pump comprises a housing having an interior that is divided by a movable wall into a pumping chamber to one side of the movable wall and a vacuum chamber to the other side. One cycle of pump reciprocation comprises a downstroke followed by an upstroke. During a downstroke, a charge of air that is in the pumping chamber is compressed by the motion of the movable wall, and a portion of the compressed charge is expelled through a one-way valve, and ultimately into the evaporative emission space being tested. The movable wall moves in a direction that contracts the pumping chamber volume while expanding the vacuum chamber volume, and the prime mover for the downstroke motion is a mechanical spring that is disposed within the vacuum chamber to act on the movable wall. During a downstroke, the spring releases stored energy to move the wall and force air through the one-way valve. At the end of a downstroke, further compression of the air charge ceases, and so the consequent lack of further compression prevents the one-way valve from remaining open.

During an upstroke, the movable wall moves in a direction that expands the volume of the pumping chamber, while contracting that of the vacuum chamber. During the upstroke, the one-way valve remains closed, but a pressure differential is created across a second one-way valve causing the latter valve to open. Atmospheric air can then flow through the second valve to enter the pumping chamber. At the end of an upstroke, a charge of air has once again been created in the pumping chamber, and at that time, the second valve closes due to lack of sufficient pressure differential to maintain it open. The pumping mechanism can then again be downstroked.

The upstroke motion of the movable wall increasingly compresses the mechanical spring to restore the energy that was released during the immediately preceding downstroke. Energy for executing an upstroke is obtained from a vacuum source, intake manifold vacuum in particular. During an upstroke a solenoid valve operates to a condition that communicates the vacuum chamber of the pump to manifold vacuum. The vacuum is strong enough to have moved the movable wall to a position where, at the end of an upstroke, the pumping chamber volume is at a maximum and that of the vacuum chamber is at a minimum. A downstroke is initiated by operating the solenoid valve to a condition that vents the vacuum chamber to atmosphere. With loss of vacuum in the vacuum chamber, the spring can be effective to move the movable wall on a downstroke.

Operation of the solenoid valve to its respective conditions is controlled by a suitable sensor or switch that is disposed in association with the pump to sense when the movable wall has reached the end of a downstroke. When the sensor or switch senses the end of a downstroke, it delivers, to an associated controller, a signal that is processed by the controller to operate the solenoid valve to communicate vacuum to the vacuum chamber. The controller operates the solenoid valve to that condition long enough to assure full upstroking, and then it operates the solenoid to vent the vacuum chamber to atmosphere so that the next downstroke can commence. At the beginning of a downstroke, the pumping chamber holds a know volume of air at atmospheric pressure. The pump is a displacement pump that has a uniform swept volume, meaning that it displaces a uniform volume of air from the pumping chamber on each full downstroke. The mass of air displaced during each full downstroke is uniform, but as the pressure in the space being tested increases, the air must be compressed to progressively increasing pressure. Because the pumping chamber contains the same known volume of air at the same known pressure at the beginning of each downstroke, and because the stroke is well defined, the time duration of the downstroke correlates with pressure in the space being tested.

The pumping mechanism is repeatedly stroked in the foregoing manner as the test proceeds. Assuming that there is no gross leak that prevents the pressure from increasing toward a nominal test pressure suitable for obtaining a leak measurement, the amount of time required to execute a downstroke becomes increasingly longer as the nominal test pressure is approached. For an evaporative emission space that has zero leakage, the pressure will eventually reach the nominal test pressure, and pump stroking will cease when that occurs. For an evaporative emission space that has small leakage less than a gross leak, the pressure will stabilize substantially at the nominal test pressure, but the pump will continue stroking because it is continually striving to make up for the leakage that is occurring. The duration of the pump downstroke is indicative of the effective leak size, and that duration decreases with increasing effective leak size. Decreasing time duration of the pump downstroke means that the pump is stroking at increasing frequency, and hence a correlation between effective leak size and pump stroke frequency also exists. Therefore, a measurement of the time interval from the end of one downstroke, as sensed by the previously mentioned sensor or switch, until the end of the immediately following downstroke, as sensed by the sensor or switch, yields a substantially accurate measurement of effective leak size. Stated another way, the rate at which the pump cycles, i.e. strokes, is indicative of effective leak size once nominal test pressure has been reached.

The accuracy of this type of test is premised on substantially constant volume of the test space and on an ability to attain nominal test pressure stability. An ability to attain nominal test pressure stability within a reasonable period of time may be a factor in minimizing the total test time, and commercial acceptance of such leak detection systems may be conditioned on accomplishing a test in fairly short overall test time. It is therefore considered desirable for stability of nominal test pressure to be promptly achieved. Because change in the size of a leak during a test would affect test accuracy, it is understood that a test result is valid only when such a change does not occur during a test.

It has been observed however that the environment of an automotive vehicle may be hostile to promptly reaching nominal test pressure stability. To some extent, the nature of the test itself may also be responsible. The pump's compression of air is not an adiabatic process, and therefore, the compression also heats the air that is being pumped into the evaporative emission space. The added heat will inherently dissipate over time to the surroundings, but as it does, there is corresponding decrease in pressure as required by physical phenomena embodied in known gas laws. Hence, for a given leak indication system of this type in a vehicle, it appears that physical laws establish some minimum time interval for attaining nominal test pressure stability, thereby precluding the shortening of that interval below that minimum.

SUMMARY OF THE INVENTION

One general aspect of the invention relates to further improvements in vapor leak measurement systems and methods, including a novel system and method that can accurately predict the stabilized time duration of the pump downstroke that will occur at nominal test pressure well in advance of attaining such stability. Accordingly, the invention makes it possible to reduce overall test time of at least some leak tests in spite of the apparent physical limitation described above because actual stability at nominal test pressure need not to be attained for every test.

The invention utilizes what is known as a logistic curve. A detailed description of a logistic curve may be found in Spiegel, *Applied Differential Equations* (*Third Edition*), 1981, Prentice-Hall, Inc. Briefly a logistic curve is a two-dimensional, continuously rising curve that has a somewhat flattened S-shape. In an X-Y plot, an initial portion of the curve has an increasing slope, and a final portion, a decreasing slope that eventually leads to a final Y-value. The X-Y coordinates where the slope transitions from increasing to decreasing define an inflection point, and X-Y coordinate data at and/or in the neighborhood of the inflection point are used to predict the final stabilized value.

One general aspect of the within claimed invention relates to a method for measuring leakage from a contained volume for holding volatile liquid, the method comprising: operating a reciprocating pump to build pressure in headspace of the contained volume toward a nominal test pressure; as the headspace pressure is building toward nominal test pressure, but before nominal test pressure is achieved, measuring, at different times, substantially the amount of time required for the pump to execute a defined downstroke; and processing the measurements and the times at which the measurements are taken in an algorithm to predict a value at which substantially the time required for the pump to execute the defined downstroke will stabilize when nominal pressure is attained.

Another general aspect relates to a method for indicating gas leakage from a contained volume, the method comprising: operating a reciprocating pump to build pressure in the contained volume toward a nominal test pressure; as the pressure is building toward nominal test pressure, but before nominal test pressure is achieved, measuring, at different times, substantially the amount of time required for the pump to execute a defined downstroke; and processing the measurements and the times at which the measurements are taken in an algorithm to define a logistic curve that has a final value corresponding to a predicted value at which substantially the amount of time required for the pump to execute a defined downstroke will stabilize.

Still another general aspect relates to a system for indicating leakage from a contained volume for holding volatile liquid, the system comprising: a reciprocating pump for building pressure in headspace of the contained volume toward a nominal test pressure; and a processor for capturing, at different times, as the headspace pressure is building toward nominal test pressure, but before nominal test pressure is achieved, measurements of substantially the amount of time required for the pump to execute a defined downstroke, and for processing the measurements and the times at which the measurements are taken in an algorithm to predict a value at which substantially the time required for the pump to execute the defined downstroke will stabilize when nominal pressure is attained.

Still another general aspect relates to a system for indicating gas leakage from a contained volume, the system comprising: a reciprocating pump for building pressure in the contained volume toward a nominal test pressure; and a processor for capturing, at different times, as the pressure is building toward nominal test pressure, but before nominal test pressure is achieved, measurements of substantially the amount of time required for the pump to execute a defined downstroke, and for processing the measurements and the times at which the measurements are taken in an algorithm to define a logistic curve that has a final value corresponding to a predicted value at which substantially the amount of time required for the pump to execute a defined downstroke will stabilize.

Further aspects will be seen in the ensuing description, claims, and accompanying drawings.

BRIEF DESCRIPTION OF THE DRAWINGS

The accompanying drawings, which are incorporated herein and constitute part of this specification, relate to one or more presently preferred embodiments of the invention, and together with a general description given above and a detailed description given below, serve to disclose principles of the invention in accordance with a best mode con plated for carrying out the invention.

DESCRIPTION OF THE PREFERRED EMBODIMENT

Figure 5:
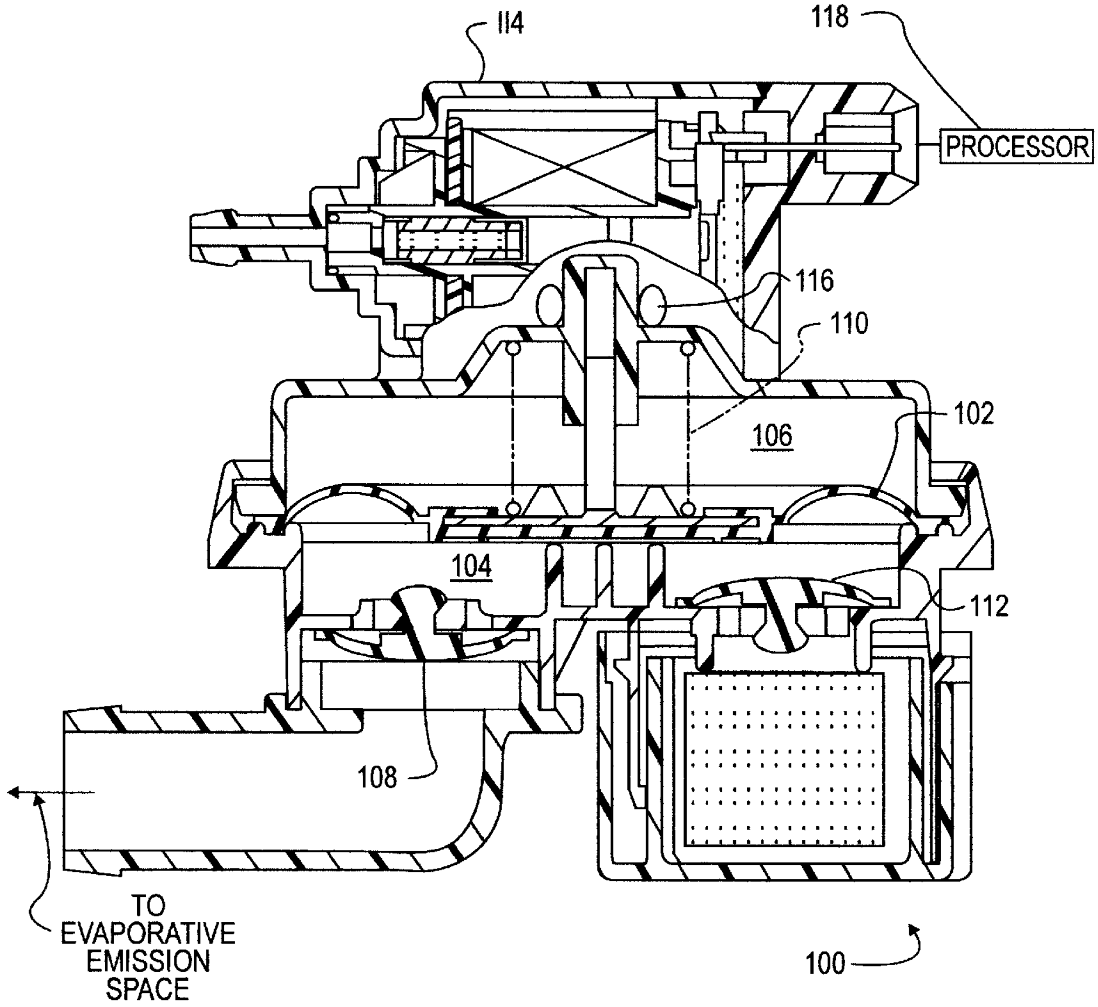
FIG. 5 is a view illustrating a leak detection system that operates in accordance with principles of the present invention.

FIG. 5 illustrates an example of a leak detection test system, including a reciprocating pump 100, of the type described above, which comprises a housing that is divided by a movable wall 102 into a pumping chamber 104 to one side of the movable wall and a vacuum chamber 106 to the other side. One cycle of pump reciprocation comprises a downstroke followed by an upstroke. During a downstroke, a charge of air that is in pumping chamber 104 is compressed by the motion of movable wall 102 , and a portion of the compressed charge is expelled through a one-way valve 108, and ultimately into the evaporative emission space being tested. Wall 102 moves in a direction that contracts the pumping chamber volume while expanding the vacuum chamber volume, with the prime mover for the downstroke motion being a mechanical spring 110 that is disposed within vacuum chamber 106 to act on wall 102. During a downstroke, the spring releases stored energy to move the wall and force air through the one-way valve. At the end of a downstroke, further compression of the air charge ceases, and so the consequent lack of further compression prevents the one-way valve from remaining open.

During an upstroke, movable wall 102 moves in a direction that expands the volume of pumping chamber 104, while contracting that of vacuum chamber 106. During the upstroke, one-way valve 108 remains closed, but a pressure differential is created across a second one-way valve 112 causing the latter valve to open. Atmospheric air can then flow through the second valve to enter the pumping chamber. At the end of an upstroke, a charge of air has once again been created in the pumping chamber, and at that time, the second valve closes due to lack of sufficient pressure differential to maintain it open. The pumping mechanism can then again be downstroked.

The upstroke motion of movable wall 102 increasingly compresses mechanical spring 110 to restore the energy that was released during the immediately preceding downstroke. Energy for executing an upstroke is obtained from a vacuum source, intake manifold vacuum in particular. During an upstroke, a solenoid valve 114 operates to a condition that communicates the vacuum chamber of the pump to manifold vacuum. The vacuum is strong enough to have moved movable wall 102 to a position where, at the end of an upstroke, the pumping chamber volume is at a maximum and that of the vacuum chamber is at a minimum. A downstroke is initiated by operating the solenoid valve to a condition that vents the vacuum chamber to atmosphere. With loss of vacuum in the vacuum chamber, spring 110 can be effective to move wall 102 on a downstroke.

Operation of the solenoid valve to its respective conditions is controlled by a suitable sensor or switch 116 that is disposed in association with the pump to sense when movable wall 102 has reached the end of a downstroke. When the sensor or switch senses the end of a downstroke, it delivers, to an associated processor 118, a signal that is processed to operate solenoid valve 114 to communicate vacuum to the vacuum chamber. The processor operates the solenoid valve to that condition long enough to assure full upstroking, and then it operates the solenoid to vent the vacuum chamber to atmosphere so that the next downstroke can commence.

At the beginning of a downstroke, the pumping chamber 104 holds a known volume of air at atmospheric pressure. The pump is a displacement pump that has a uniform swept volume, meaning that it displaces a uniform volume of air from the pumping chamber on each full downstroke. The mass of air displaced during each full downstroke is uniform, but as the pressure in the space being tested increases, the air must be compressed to progressively increasing pressure. Because the pumping chamber contains the same known volume of air at the same known pressure at the beginning of each downstroke, and because the stroke is well defined, the time duration of the downstroke correlates with pressure in the space being tested. The pumping mechanism is repeatedly stroked in the foregoing manner as the test proceeds.

As pressure builds toward the nominal test pressure, the amount of time required for the pump to execute a downstroke becomes increasingly longer. The amount of time required for the pump to execute a downstroke may be referred to as a Pulse Duration Time Interval. In other words, the frequency at which the pump reciprocates, progressively decreases as pressure increases.

It can therefore be appreciated that the time interval between immediately consecutive sensings of the end of immediately consecutive downstrokes also becomes increasingly longer. The time interval between such immediately consecutive sensings may, for convenience, be referred to as a Pulse Duration Time Interval. Stated another way, the frequency of such immediately consecutive sensings, i.e. the frequency at which the pump reciprocates, progressively decreases as pressure increases.

Figure 1:
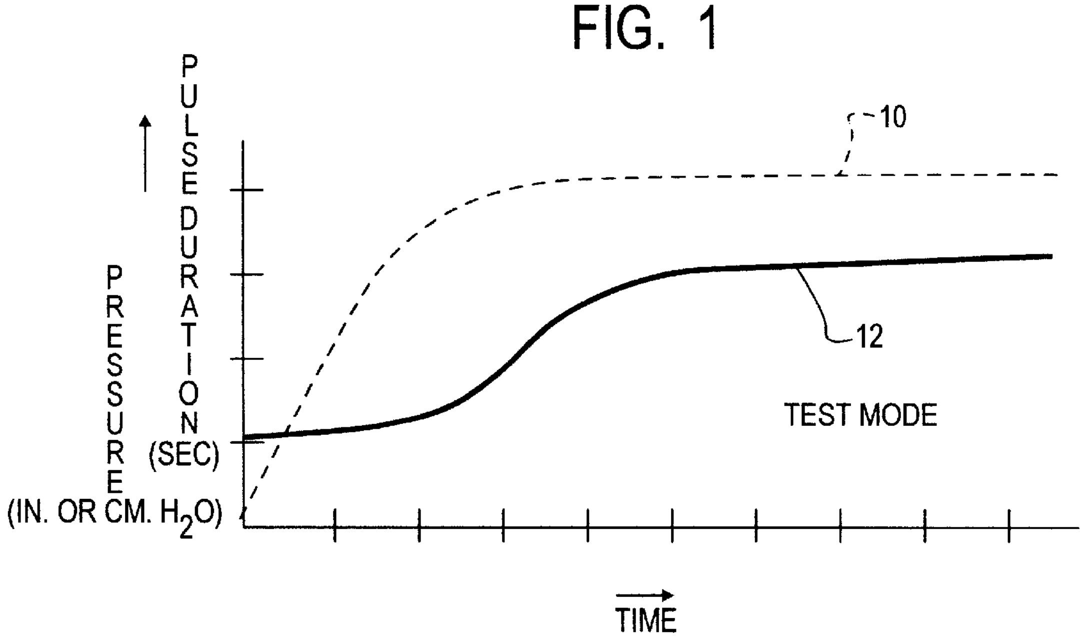
FIG. 1 is a first graph plot useful in explaining principles of the invention.

FIG. 1 shows two representative traces 10 and 12 on an X-Y graph plot. Trace 10 shows pressure as a function of time during a leak test which is being conducted in what is called a test measurement pumping mode. Trace 12 represents the Pulse Duration Time Interval as a function of time as pressure is building in accordance with trace 10. The Y-axis contains no numerical values for either pressure or Pulse Duration Time Interval. During an initial portion of the test, the pump operates rapidly attempting to build pressure. In the absence of a gross leak, the pressure will build toward nominal test pressure, and it will eventually reach stability at the nominal test pressure, with the stroke rate progressively diminishing as the nominal test pressure is approached. If a gross leak is present, the pump will continue stroking rapidly beyond an elapsed time by which the rate should have begun to slow. In that event, the test is discontinued, and a gross leak is indicated.

The present invention arises through the recognition that trace 12 corresponds substantially to a logistic curve, as defined in Spiegel, supra.

A logistic curve has a defined characteristic shape. Because of that characteristic shape, knowledge of a logistic curve's values at and/or near its inflection point can be used to accurately predict the final value. This can be seen in the example of FIG. 2. Values at the inflection point DP1 and at two different points DP2, DP3 after the inflection point are processed in accordance with an algorithm to yield the final stabilized value. Hence, by measuring Pulse Duration Time Interval values at corresponding points along trace 12 in FIG. 1, the stabilized Pulse Duration Time Interval that will occur when nominal test pressure is reached can be predicted. It is believed that the particular times at which measurements of the data points should be taken can be determined in any of several different ways using any of several different algorithms.

An example of an algorithm comprises the repeated processing of successive pulse duration measurements to repeatedly derive the rate at which the pulse duration is changing. Before the inflection point of the logistic curve, the rate at which the pulse duration is changing is positive, but that rate progressively diminishes as the inflection point is approached, reaching zero at the inflection point. After the inflection point, the rate at which the pulse duration is changing becomes negative. When the repeated calculation performed by the algorithm detects the positive-to-negative transition in the rate of change of pulse duration, the algorithm may flag that data as the inflection point. Data for subsequent data points is obtained, and because the logistic curve has a defined shape, those data points inherently define the final value for the pulse duration. The algorithm's processing of those data points in accordance with the defined shape of the logistic curve yields the final value at which the pulse duration will stabilize.

Therefore when an evaporative emission system leak test is being performed, an on-board electronic processor can measure Pulse Duration Time Intervals as the test progresses and ascertain the inflection point. The processor also measures one or more Pulse Duration Time Intervals after the inflection point, and then processes the obtained measurements according to a programmed algorithm to yield a value for the stabilized Pulse Duration Time Interval. Because the relevant measurements are obtained well before the Pulse Duration Time Interval actually stabilizes, and because of the fast processing speed of the processor, the final stabilized value of the Pulse Duration Time Interval can be predicted well in advance of actual stability. This enables a test to be completed in a significantly shorter time than that required to attain actual stability.

For further reducing the overall test time, the pump may be operated first in an accelerated pumping mode to more rapidly build pressure, and thereafter in a test measurement pumping mode. In the accelerated pumping mode, the pump is stroked by a signal from the controller that terminates a downstroke before a full downstroke, that otherwise would trip the downstroke sensor or switch, is completed. In that way, the spring whose force is compressing the air in the pumping chamber during the downstroke is not allowed to relax to the extent that it otherwise would if a full downstroke were being executed, and hence the spring works within a region where it is exerting larger force on the air being compressed. Because the downstroke is being interrupted early in the accelerated pumping mode, the frequency at which the pump is being stroked is greater than if would be if allowed to complete full downstrokes. However, for the logistic curve to apply, the pump must revert to the test measurement pumping mode during which it executes full downstrokes. The accelerated pumping mode is described in commonly owned U.S. Pat. No. 5,499,614.

Figure 3:
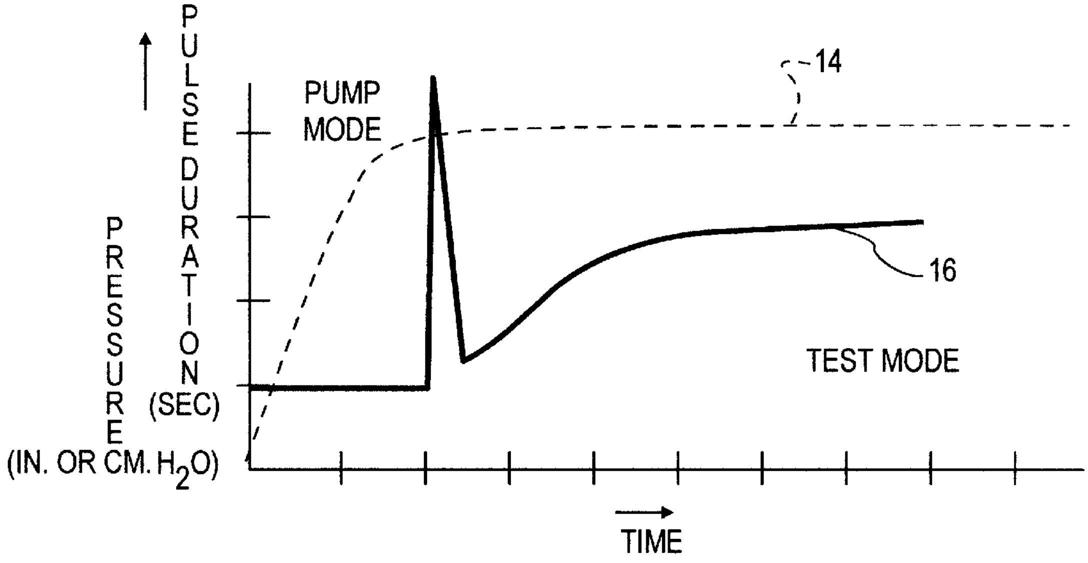
FIG. 3 is a third graph plot useful in explaining principles of the invention.
Figure 2:
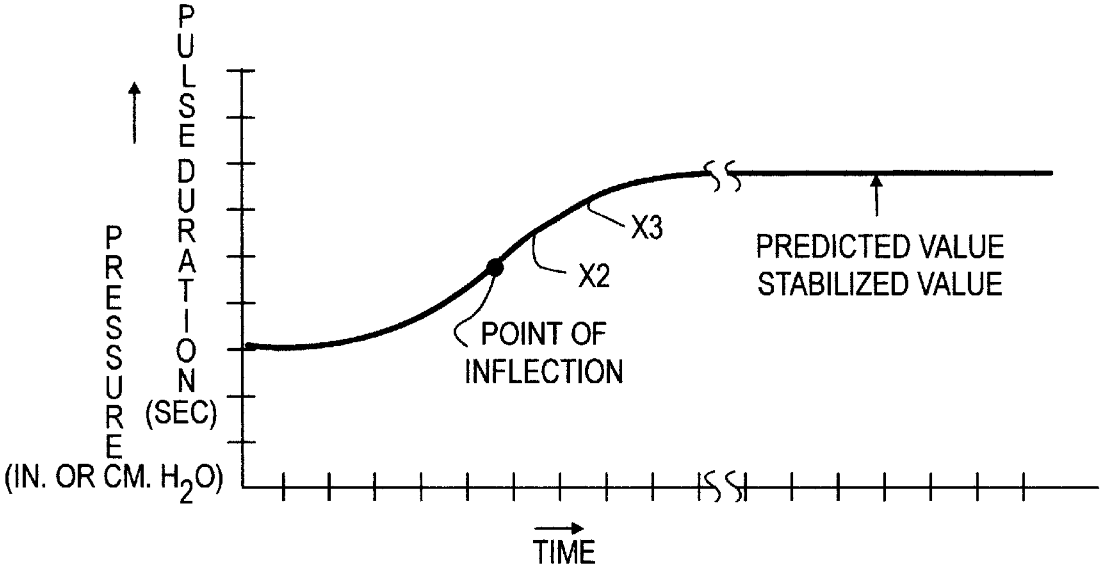
FIG. 2 is a second graph plot useful in explaining principles of the invention.

FIG. 3 shows an example of two traces 14 and 16, corresponding to traces 10 and 12 of FIG. 1, where the pump operates initially in the accelerated pumping mode, and then in the test measurement pumping mode. Trace 14 represents pressure, and trace 16, pulse duration. During the accelerated pumping mode, the pulse duration trace does not conform to an initial portion of a logistic curve. Once pump operation changes to the test measurement pumping mode, the pulse duration trace does conform to a final portion of a logistic curve. It is preferred that the accelerated pumping mode end before the inflection point of the logistic curve, as shown by the example of FIG. 2, so that the inflection point can be one of the measurements. The time at which the pump operation changes from the accelerated pumping mode to the test measurement pumping mode is marked $X_1$.

Figure 4:
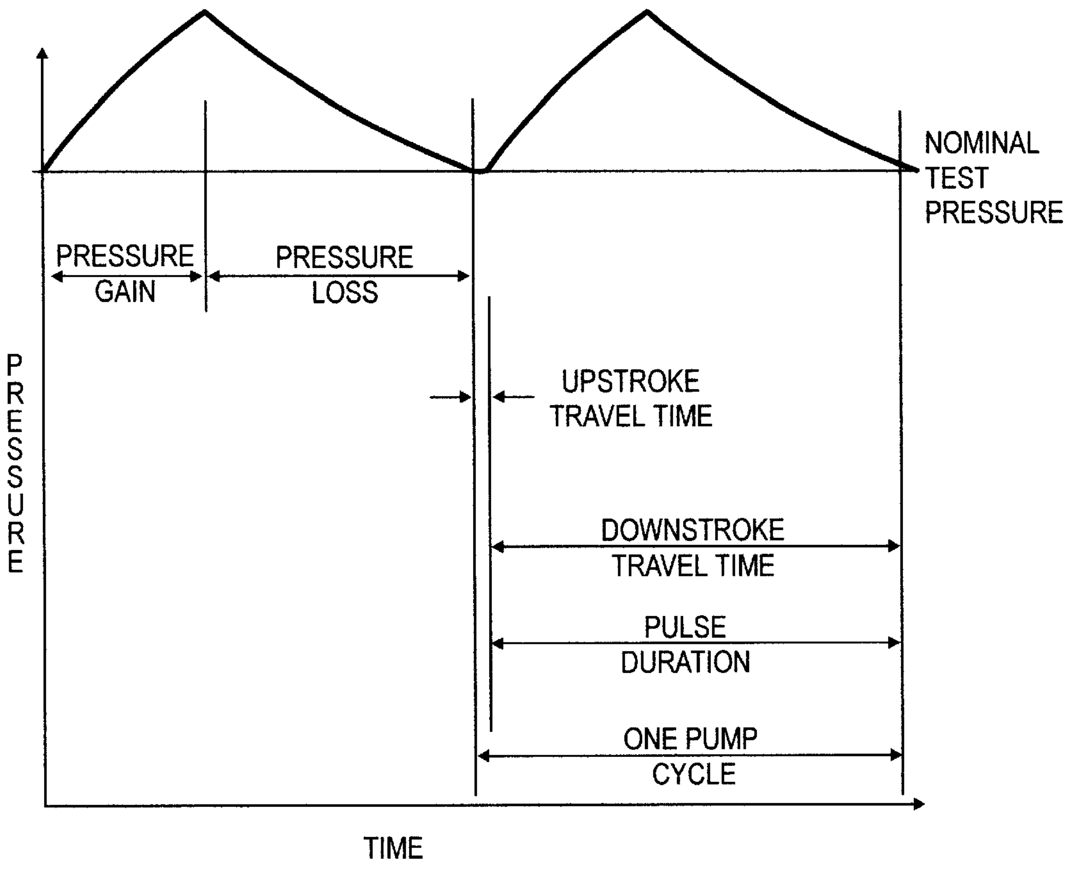
FIG. 4 is a waveform useful in explaining the inventive principles.

FIG. 4 shows detail explaining how the pump operates when allowed to achieve Pulse Duration Time Interval stability. The pump will strive to build pressure above nominal test pressure, but is limited because of a leak. Hence, the pressure in the space being tested will. experience a series of successive pressure gains and pressure losses. The series of successive upstrokes and downstrokes of the pump are shown correlated to the series of pressure gains and pressure losses. By measuring the amount of time from the end of one downstroke to the end of the next downstroke, substantially the time required for the pump to execute a defined downstroke is measured. A slightly more exact measurement may possibly be obtained if the reset time is subtracted.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A method for measuring leakage from a contained volume for holding volatile liquid, the method comprising:

operating a reciprocating pump to build pressure in headspace of the contained volume toward a nominal test pressure;

as the headspace pressure is building toward nominal test pressure, but before nominal test pressure is achieved, measuring, at different times, substantially the amount of time required for the pump to execute a defined downstroke; and processing the measurements and the times at which the measurements are taken in an algorithm to predict a value at which the time required for the pump to execute the defined downstroke will stabilize when nominal pressure is attained.

2. A method as set forth in claim 1 in which the algorithm processes the measurements and the times at which the measurements are taken to define a logistic curve that has a final value corresponding to the predicted value.

3. A method as set forth in claim 2 in which:

the pump is operated in an accelerated pumping mode during an initial span of a test time and in a test measurement pumping mode during a final span of the test time, and the measurements are taken during the final span of the test time.

4. A method as set forth in claim 3 in which the pump operation changes from the accelerated pumping mode to the test measurement pumping mode prior to the inflection point of the logistic curve.

5. A method as set forth in claim 1 in which the pump operates to build superatmospheric pressure in the headspace.

6. A method as set forth in claim 1 including the step of processing the predicted value to determine leakage.

7. A method for indicating gas leakage from a contained volume, the method comprising:

operating a reciprocating pump to build pressure in the contained volume toward a nominal test pressure;

as the pressure is building toward nominal test pressure, but before nominal test pressure is achieved, measuring, at different times, substantially the amount of time required for the pump to execute a defined downstroke; and processing the measurements and the times at which the measurements are taken in an algorithm to define a logistic curve that has a final value corresponding to a predicted value at which substantially the amount of time required for the pump to execute a defined downstroke will stabilize.

8. A method as set forth in claim 7 including the step of processing the final value of the logistic curve to determine leakage.

9. A system for indicating leakage from a contained volume for holding volatile liquid, the system comprising:

a reciprocating pump for building pressure in headspace of the contained volume toward a nominal test pressure; and a processor for capturing, at different times, as the headspace pressure is building toward nominal test pressure, but before nominal test pressure is achieved, measurements of substantially the amount of time required for the pump to execute a defined downstroke, and for processing the measurements and the times at which the measurements are taken in an algorithm to predict a value at which substantially the time required for the pump to execute the defined downstroke will stabilize when nominal pressure is attained.

10. A system as set forth in claim 9 in which the processor processes the measurements and the times at which the measurements are taken to define a logistic curve that has a final value corresponding to the predicted value.

11. A system as set forth in claim 10 in which the pump operates in an accelerated pumping mode during an initial span of a test time and in a test measurement pumping mode during a final span of the test time, and the captured measurements are from the final span of the test time.

12. A system as set forth in claim 11 in which the pump changes operation from the accelerated pumping mode to the test measurement pumping mode prior to the inflection point of the logistic curve.

13. A system as set forth in claim 9 in which the pump operation builds superatmospheric pressure in the headspace.

14. A system as set forth in claim 9 in which the processor processes the predicted value to determine leakage.

15. A system for indicating gas leakage from a contained volume, the system comprising:

a reciprocating pump for building pressure in the contained volume toward a nominal test pressure; and a processor for capturing, at different times, as the pressure is building toward nominal test pressure, but before nominal test pressure is achieved, measurements of substantially the amount of time required for the pump to execute a defined downstroke, and for processing the measurements and the times at which the measurements are taken in an algorithm to define a logistic curve that has a final value corresponding to a predicted value at which substantially the amount of time required for the pump to execute a defined downstroke will stabilize.

16. A system as set forth in claim 15 in which the processor processes the final value of the logistic curve to determine leakage.

* * * * *